United States Patent [19]

Ha

[11] Patent Number: 4,684,177
[45] Date of Patent: Aug. 4, 1987

[54] AUTOMATIC CONTROL CIRCUIT FOR BRAKE CONTROL DEVICES

[75] Inventor: Jung Yong Ha, Seoul, Rep. of Korea

[73] Assignee: Kia Motors Corp., Seoul, Rep. of Korea

[21] Appl. No.: 797,091

[22] Filed: Nov. 12, 1985

[30] Foreign Application Priority Data

Nov. 14, 1984 [KR] Rep. of Korea .................. 84-7181

[51] Int. Cl.$^4$ .......................................... B60T 17/16
[52] U.S. Cl. ............................. 303/100; 192/3 TR; 192/3 H; 315/82
[58] Field of Search .............. 192/3 TR, 3 H; 315/82, 315/83; 303/100, 103, 89

[56] References Cited

U.S. PATENT DOCUMENTS 3,893,698  6/1975  Fontaine ................... 192/3 TR
4,076,093  2/1978  Mizuno ...................... 192/3 TR

FOREIGN PATENT DOCUMENTS

0012352  1/1985  Japan ....................... 315/82

*Primary Examiner*—Duane A. Reger
*Assistant Examiner*—Matthew C. Graham
*Attorney, Agent, or Firm*—Townsend and Townsend

[57] ABSTRACT

An automatic control circuit for a brake control device, relays around the device, light lamps and other parts to be operated differently under different circumstances, e.g., braking while running, braking to stop, releasing the brake pedal after braking, starting, parking after braking, and operation when the car stops in semi-automatic. The automatic control circuit operates a valve in the hydraulic system which isolates the system after hydraulic pressure is increased, thus maintaining braking pressure even when the brake pedal is released. The valve isolates the hydraulic system until the clutch pedal is released and the accelerator pedal is depressed, then the valve is allowed to open and pressure is released. A vehicle movement detector is coupled to the circuit which ensures that brake pressure will not automatically be maintained when the vehicle is moving. The vehicle movement detector is also capable of controlling a headlight relay so that current to the headlights is cut off when the vehicle is stationary, but current is allowed to pass to the headlights when the vehicle is in motion. The automatic control circuit is also capable of operating brake lights, pilot light and parking lamps.

7 Claims, 7 Drawing Figures

AUTOMATIC CONTROL CIRCUIT FOR BRAKE CONTROL DEVICES

FIELD OF THE INVENTION

This invention relates to an automatic control circuit for brake control devices used in cars, and, more particularly, to the automatic control circuit for brake control devices which control a brake control system, relays within the system, light lamps and movement of parts when a car is braked.

BACKGROUND OF THE INVENTION

Generally, in order to brake a moving vehicle, the driver presses a brake pedal and a clutch pedal at the same time. Then, the pressure switch of the brake control device turns on, and a brake lamp and brake pilot lamp are turned on.

For starting again, the driver releases the brake pedal, presses the accelerator pedal, and simultaneously releases the clutch pedal slowly. Then the car starts, oil pressure supplied to the brake control device is removed, and the brake lamp and brake pilot lamp are turned off.

When the driver tries to park the car or to stop the car for a long time, he pulls the parking brake and releases the brake pedal. After that, when the driver tries to start again, he releases the parking brake and steps on the accelerator pedal while releasing the clutch pedal slowly.

When the driver tries to start after stopping on an uphill road, the driver engages the low gear, releases the brake pedal, and steps on the accelerator pedal while simultaneously releasing the clutch pedal, and then the car starts. At this moment, if the driver releases the clutch pedal too fast, the engine of the car stops. On the contrary, if the driver releases the clutch pedal too slowly, the car rolls backward, possibly causing accidents with other cars in back of it. To prevent these accidents, veteran dexterity and highly developed skill are required for drivers.

SUMMARY OF THE INVENTION

The purpose of the present invention is to provide a control circuit for a brake control device, relays around the device, light lamps and other parts to be operated differently under different circumstances (for example, braking while running, braking to stop, releasing the brake pedal after braking, starting, parking after braking, and operation when the car stops in semi-automatic, etc.).

In the present invention, a valve located within the hydraulic system of the brake control device is activated by a function solenoid whenever the driver steps on the brake pedal and the clutch pedal. By pressing against a valve seat, the valve isolates the hydraulic path between the brake master cylinder and the brake wheel cylinder. When the driver releases the brake pedal, the current supplied to the function solenoid is cut off, but the valve remains seated and brake pressure is maintained.

The valve is opened, and pressure is released, by the operation of a release solenoid controlled by a release relay. The release relay is activated by switches connected to the accelerator and clutch pedals, and also by a speed relay which operates when the vehicle is moving. Thus, while stationary, braking pressure is maintained, but when the driver releases the clutch pedal while stepping on the accelerator pedal, the accelerator and clutch pedals operate to activate the release relay which in turn causes the release solenoid to open the valve and release brake pressure. When the vehicle is in motion, the speed relay prevents continuous operation of the brakes after braking while running.

The headlights also may be controlled by the system. The speed relay is coupled to a headlight relay such that once the main headlight switch is turned on and the vehicle is in motion, the headlights are allowed to operate, but when the vehicle stops, the headlight relay is activated and current to the headlights is cut off. Thus, when the vehicle is in motion the headlights are automatically turned on, but when the car stops, the headlights turn off.

DESCRIPTION OF A SPECIFIC EMBODIMENT

Figure 1:
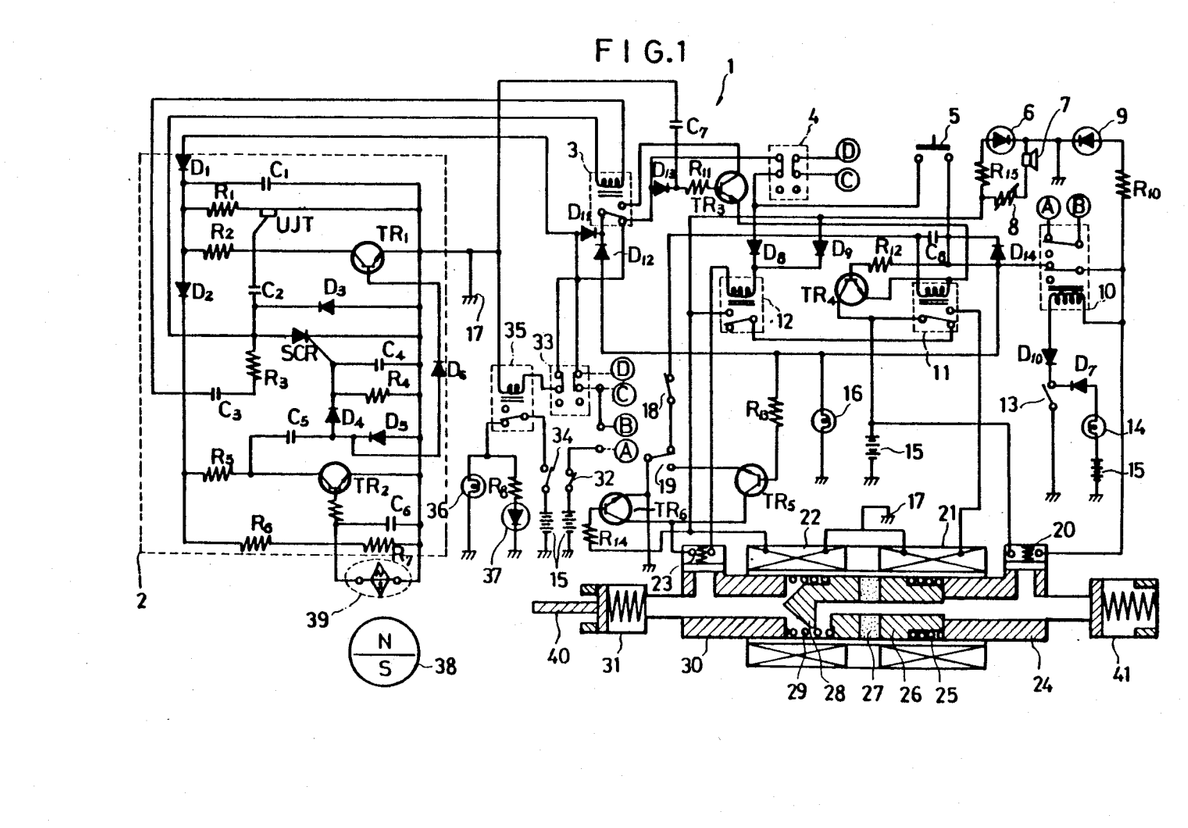
FIG. 1 shows a circuit coupling of this invention.

FIG. 1 shows a complete circuit coupling of this invention.

A brake control device consisting of a valve body 24, a small spring 25, a plunger 26, non-ferrous metals 27, a valve 28, a large spring 29, a valve seat 30, a brake master cylinder 31, a brake pedal 40 and a brake wheel cylinder 41 is connected to a relay control circuit 1 consisting of a light system and a plurality of relays and switches, described below, and a detective part of rotational speed 2 which produces a pulse when the car is in motion.

Said detective part of rotational speed 2 connects to a coil of a speed relay 3, a diode D12 that mediates a diode D11, a connection switch of a speed relay 3, a lead switch 39 which turns on or cuts off a current in accordance with rotation of a speed sensor 38, a headlight automatic switch 33, and a coil of a headlight relay 35.

The connection switch of speed relay 3 mentioned above is connected to a transistor TR3, a diode D13, a brake automatic switch 4 and headlight automatic switch 33.

The brake automatic switch 4 is connected to headlight automatic switch 33 which in turn is connected to the coil of headlight relay 35, a connection switch of a parking relay 10, a push switch 5, a diode D9 which mediates a diode D8 and a coil of function relay 12.

Push switch 5 is connected to a condenser C8, a resistor R12, transistors TR3 and TR4, a coil of a release relay 11, a different connection switch of parking relay 10 which mediates a diode D14, a brake lamp 16, a resistor R13, and a diode D12.

The different connection switch of parking relay 10 is connected to a brake pilot lamp 9 which mediates a resistor R10.

A pressure switch 20 and the brake pilot lamp 9 mentioned above are connected to a function pilot lamp 6 and a buzzer 7, and the coil of parking relay 10 is connected to a diode D7 that is connected directly with a parking switch 13 which mediates a diode D10, a parking pilot lamp 14 and a storage battery 15.

The connection switch of release relay 11 mentioned above is connected to a transistor TR4, a storage battery 15, a pressure switch 20, a release solenoid 21 and function relay 12.

The connection switch of function relay 12 mentioned above is connected to a function solenoid 22 which is connected to a release solenoid 21, a transistor TR6 which mediates a resistor R14, a resistor R15 and a variable resistor 8.

The coil of release relay 11 is connected to an accelerator switch 18, which in turn is connected to a clutch pedal limit switch 19, a transistor TR5, a brake switch 23 and the coil of function relay 12 in that order.

The connection switch of parking relay 10 is connected to a key switch 32 and a storage battery 15 in that order, and a headlight relay 35 is connected to a headlight switch 34 in series with a storage battery 15, and to a headlight 36 in parallel with a headlight pilot lamp 37.

Control circuit 1 is not activated while the car is parked, but if the driver inserts a key into key switch 32 for starting and turns it to the location of a function, the relay control circuit 1 and the detective part of rotational speed 2 is charged with a current. So, when the car moves, relay control circuit 1 operates.

At this time, speed sensor 38 revolves and the current is cut off and turned on at lead switch 39 and a pulse is generated at detective part of rotational speed 2, and if the pulse generates like this, turning on a lot of current at the coil of speed relay 3, the switch of speed relay 3 turns on. After that, if the car stops, the switch of speed relay 3 turns off because a pulse is no longer generated by detective part of rotational speed 2.

On running downhill or on running with an accelerated speed, when the driver tries to reduce speed, a pulse is generated at the detective part of rotational speed 2, mentioned above, and ascended current is supplied to the coil of speed relay 3. The connection switch in speed relay 3 turns on, and speed relay 3 operates. After that, when the car stops completely the connection switch of the speed relay 3 turns off because a pulse isn't generated at the detective part of rotational speed 2.

Figure 2:
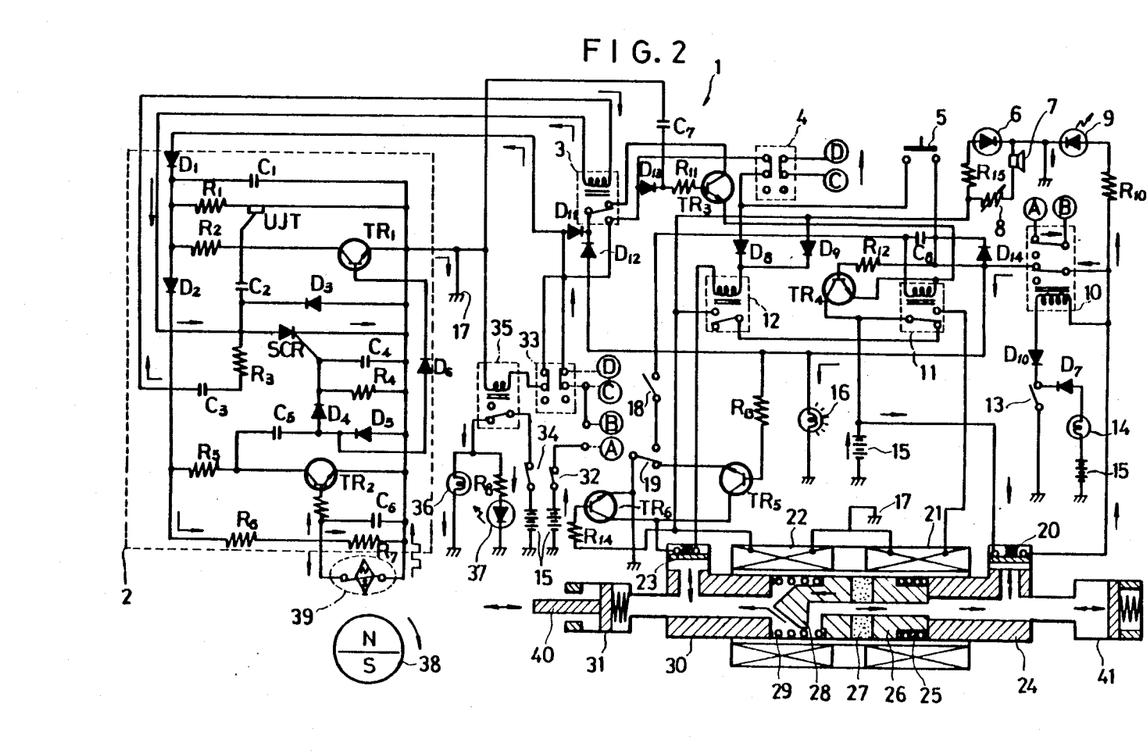
FIG. 2 shows circuit conditions when braking a car while running.

On running the function relay 12 doesn't operate because brake switch 23 is off. When the car is braked on running, as shown in FIG. 2, if the driver steps on brake pedal 40, oil pressure is provided to brake master cylinder 31, brake switch 23 turns on, and pressure switch 20 turns on. At this time, the current of storage battery 15 is supplied to brake pilot lamp 9 through pressure switch 20, and brake lamp 16 through the different connection switch of parking relay 10.

If the driver releases the brake pedal 40, the oil pressure is released, and at the same time the brake switch 23 and pressure switch 20 turn off, and brake pilot lamp 9 and brake lamp 16 are turned off.

Current is supplied to headlight auto switch 33 through key switch 32. When headlight auto switch 33 is in the position shown in FIG. 2, current flows from point C to point D of headlight auto switch 33 to the connection switch of speed relay 3. From the connection switch of speed relay 3, current flows back to headlight auto switch 33 and through the coil of headlight relay 35 and subsequently to ground 17. Current is supplied to headlight 36 and headlight pilot lamp 37 from the headlight switch 34 and through the connection switch of headlight relay 35.

As shown in FIG. 2, when the vehicle is moving, the connection switch of speed relay 3 is in the uppermost position, thus cutting off current to headlight auto switch 33 and the coil of headlight relay 35. Thus, the connection switch of headlight relay 35 is in its lower position and current is allowed to flow from storage battery 15, through headlight switch 34 and to headlight 36 and headlight pilot lamp 37.

When the vehicle stops, however, detective part of rotational speed 2 cuts off current to speed relay 3, and the connection switch of speed relay 3 returns to its lower position. Thus, when the vehicle is braked to a stop, current from storage battery 15 flows through pressure switch 20, parking relay 10, speed relay 3, headlight auto switch 33, and the coil of headlight relay 35, causing the connection switch of headlight 35 to assume its upper position. This causes current from storage battery 15 to be cut off from headlight 36 and headlight pilot lamp 37, causing them to turn off.

When the car is started again, current is again supplied to speed relay 3, the connection switch of speed relay 3 assumes it upper position again, headlight relay 35 is de-energized, and current is allowed to flow to headlight 36 and headlight pilot 37 again.

Figure 3:
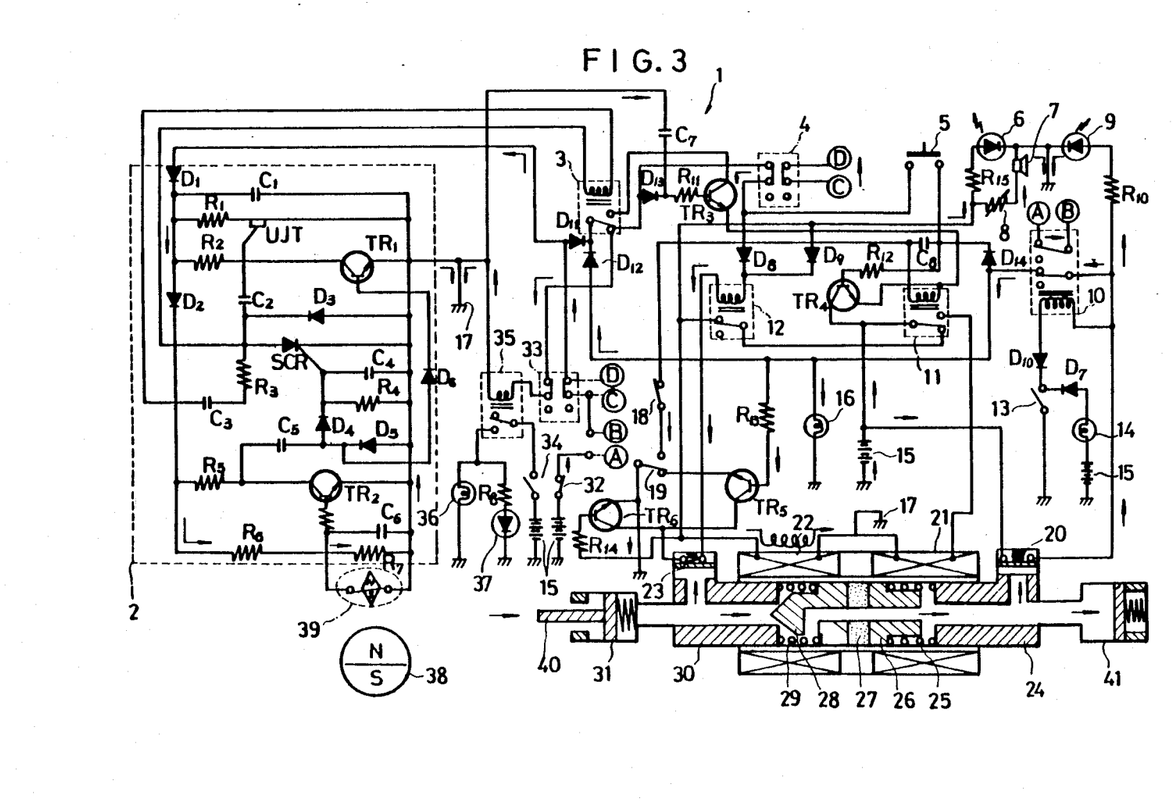
FIG. 3 shows circuit conditions when braking a car to a full stop.

FIG. 3 shows circuit operating conditions when the car is braked to a stop.

If the car is stopped completely after braking, speed sensor 38 stops turning, causing the detective part of rotational speed 2 to stop generating pulses. This cuts off current to the coil of speed relay 3, and the connection switch of speed relay 3 assumes its lower position.

At that time, when the driver steps on brake pedal 40, braking occurs because oil pressure is supplied to the brake master cylinder 31 and the brake wheel cylinder 41. Then current of the storage battery 15 is supplied to brake pilot lamp 9 through pressure switch 20 and to brake lamp 16 through the different connection switch of parking relay 10.

At the same time, current is supplied to headlight relay 35. Headlight relay 35 energizes, cutting off current to headlight 36 and headlight pilot 37 and turning them off.

The current through the connection switch of speed relay 3 moves through brake automatic switch 4, the coil of function relay 12, brake switch 23, and to transistor TR5. Current is supplied to the base of transistor TR5 from parking relay 10 and through resistor R13. Transistor TR5 is turned on, and current passes through clutch pedal limit switch 19 to ground.

The current through the coil of function relay 12 energizes it and causes the connection switch to assume its upper position. Accordingly, current is supplied to the function solenoid 22 through function relay 12, and valve 28 of the brake control device is seated to the valve seat 30. This creates a pressurized, isolated oil path from the brake master cylinder to the brake wheel cylinder, and braking pressure is maintained.

At the same time, current is supplied to function pilot lamp 6 and buzzer 7, causing them to operate.

Figure 4:
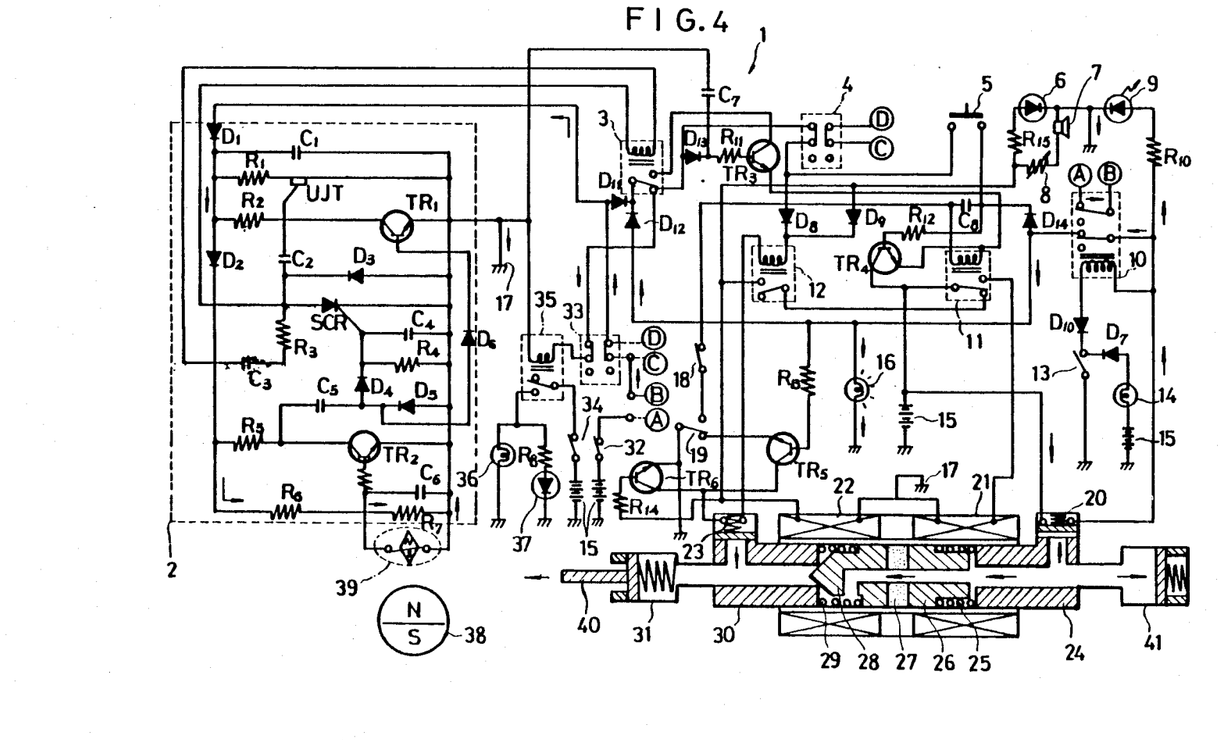
FIG. 4 shows circuit conditions when releasing the brake pedal after the car stops.

As shown in FIG. 4, when the driver releases brake pedal 40, the pressure of the brake master cylinder is released, and brake switch 23 is turned off. However, because of the hydraulic isolation brought about by the seating of valve 28 on valve seat 30, braking is maintained, pressure switch 20 remains on, and brake lamp 16 and brake pilot lamp 9 remain on. Because pressure switch 20 remains on, current is still supplied to headlight relay 35, keeping headlight 36 and headlight pilot lamp 37 off.

Because pressure is released at brake master cylinder 31, brake switch 23 turns off, function relay 12 is de-energized, and current is cut off to function pilot lamp 6 and buzzer 7.

Figure 5:
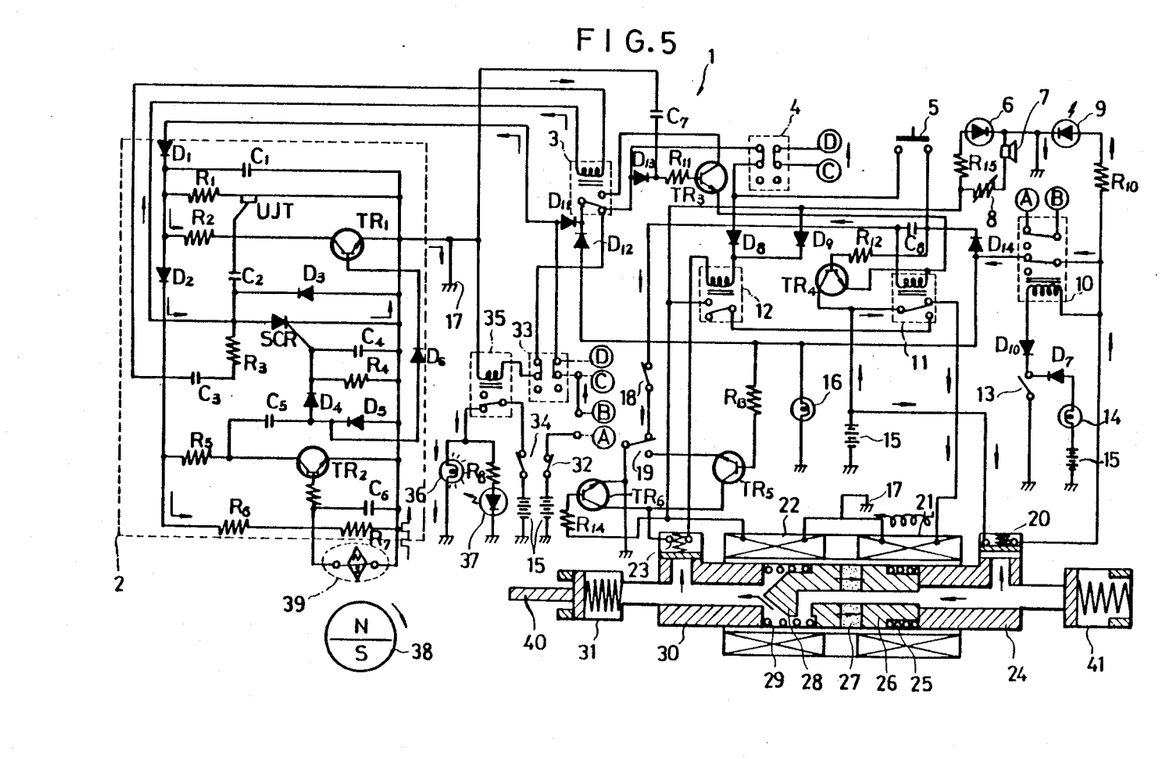
FIG. 5 shows circuit conditions when the car resumes movement.

FIG. 5 shows circuit operation when the driver starts the car after stopping.

If the driver steps on the accelerator pedal and releases the clutch pedal, accelerator switch 18 and the clutch pedal limit switch 19 assume the positions shown. Current from storage battery 15 is supplied to the base of transistor TR4 through the pressure switch 20 and the parking relay 10, allowing transistor TR4 to turn on. Current flows from storage battery 15, to the collector of transistor TR4, through transistor TR4, the coil of release relay 11, accelerator switch 18, clutch pedal limit switch 19 and to ground. By energizing release relay 11, the connection switch assumes its upper position, and current is allowed to flow from storage battery 15 to release solenoid 21. This time, plunger 26 causes valve 28 to move toward valve body 24, valve 28 is detached from the valve seat 30, oil supplied to brake wheel cylinder 41 moves to brake master cylinder 31, oil pressure is removed, and the brakes are released.

Pressure switch 20 then turns off, current supplied to the base of transistor TR4 is cut off, release solenoid 21 is de-energized, and brake lamp 16 and brake pilot light 9 are turned off. By the degree of the driver stepping on the accelerator pedal, the car is started.

As the car is driven, speed relay 3 is energized, current is cut off to the coil of headlight relay 35, and headlight 36 and headlight pilot lamp 37 turn on.

Figure 6:
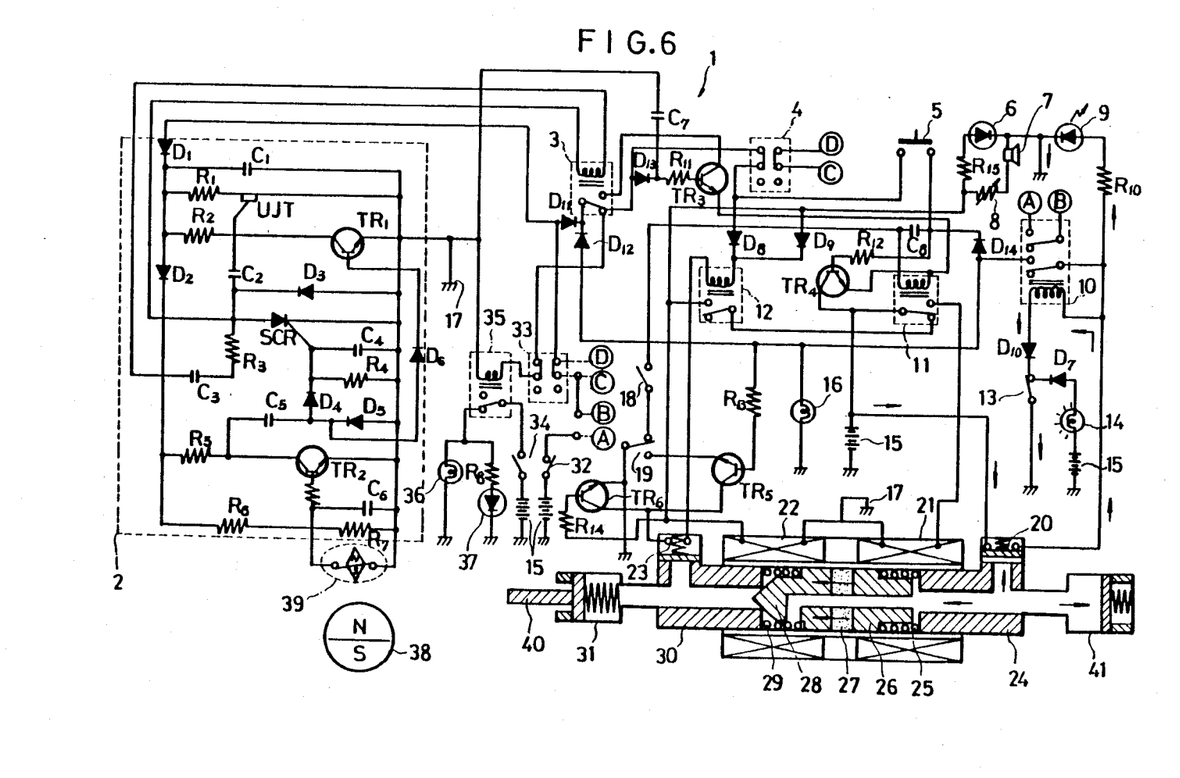
FIG. 6 shows circuit conditions when parking a car after braking to a stop.

FIG. 6 shows circuit operation when the parking brake is used after a stop.

When the driver operates the parking brake, parking switch 13 turns on, and pressure in the system causes pressure switch 20 to turn on. When pressure switch 20 turns on, current from storage battery 15 is allowed to flow through and energized parking relay 10, causing both connection switches of parking relay 10 to assume their lower positions. This cuts off current to the rest of the circuit, including function relay 12 and release relay 11. The brake lamp 16 is turned off, but the brake pilot lamp 9 and the parking pilot lamp 14 is turned on.

Figure 7:
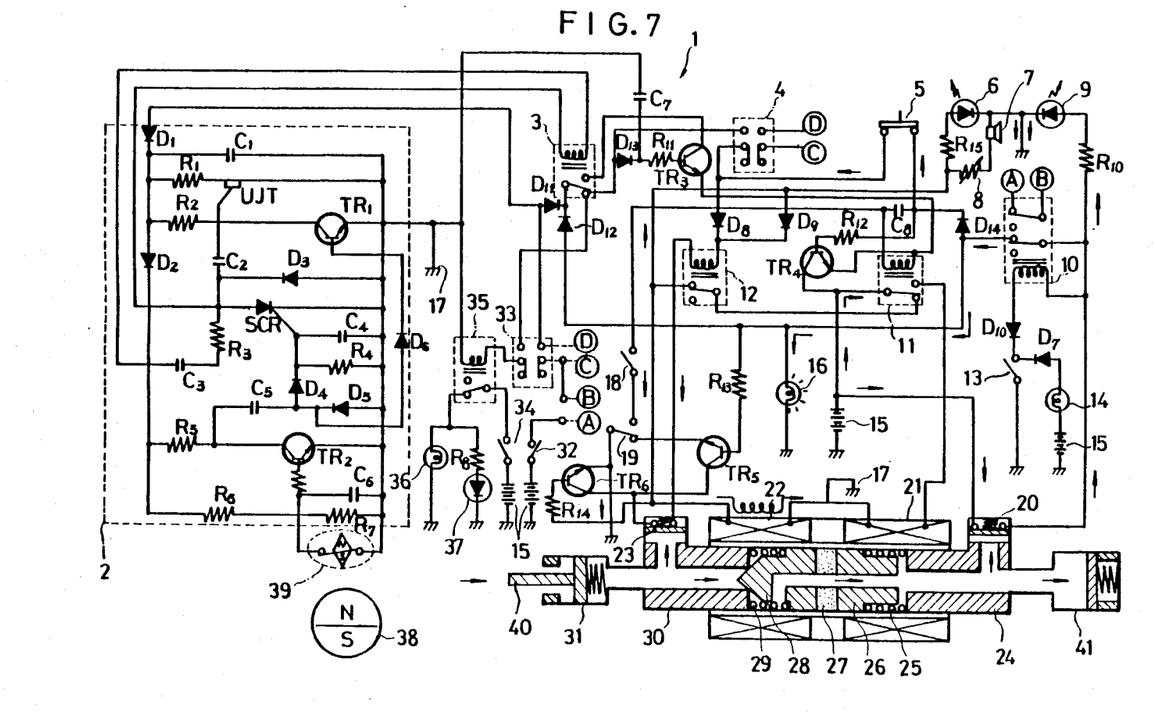
FIG. 7 shows circuit conditions when stopping under semi-automatic operation.

FIG. 7 shows circuit operation in semi-automatic mode. When brake auto switch 4 is put in semi-automatic position as shown in FIG. 7, function relay 12 doesn't operate automatically, but the driver may operate function solenoid 22 manually using push switch 5 in case of necessity.

In this situation, the driver steps on the brake pedal 40 and the clutch pedal. Current is supplied to brake pilot lamp 9 through the pressurized switch 20 and brake pilot lamp 9 lights. Similarly, current flows through the different connection switch of parking relay 10 and brake lamp 16 lights.

By pressing push switch 5, current flows through the coil of function relay 12, brake switch 23, transistor TR5, clutch pedal limit switch 19, and then to ground. Current flows through the connection switch of function relay 12 and to the function solenoid 22, which causes the valve 28 to seat to the valve seat 30, isolating the hydraulic system. Since braking pressure is maintained by the seating of valve 28 on valve seat 30, braking is maintained when the driver releases the brake pedal.

The current through the connection switch of function relay 12 is also supplied to light the function pilot lamp 6 and sound the buzzer 7. When push switch 5 is released, current is cut off to the function relay 12 and the function pilot lamp 6 and buzzer 7 are turned off.

The foregoing allows automatic operation of a brake control device, relays around the device, light lamps and other parts to be operated differently under different circumstances, e.g., braking while running, braking to stop, releasing the brake pedal after braking, starting, parking after braking, and operation when the car stops in semi-automatic, etc.

While the above is a complete description of a preferred embodiment of the present invention, various modifications may be employed. For example, the relays may be replaced by transistors, and other circuit components may be added which derive power from the relays and switches in the system.

Consequently, the description should not be used to limit the scope of the invention which is properly set out in the claims.

What is claimed is:

1. An automatic control circuit for a brake control device comprising:
   a hydraulic brake control device for braking a vehicle in response to a hydraulic pressure therein;
   a brake switch, coupled to the brake control device, for detecting a first prescribed hydraulic pressure in the brake control device and for flowing a current in response thereto;
   means, responsive to the current from the brake switch, for maintaining a hydraulic pressure in an oil path in the brake control device and for maintaining a brake to the vehicle when the vehicle is stopped;
   means, coupled to the brake control device, for releasing the hydraulic pressure maintained in the oil path;
   means for accelerating a vehicle; and
   means, coupled to the accelerating means, the pressure maintaining means, and the pressure releasing means, and responsive to the accelerating means, for releasing the hydraulic pressure maintained in the oil path upon vehicle acceleration.

2. The control circuit according to claim 1 further comprising:
   means for detecting a prescribed vehicle speed;
   a speed relay, connected to the speed detecting means, for flowing a current along a first path when the prescribed speed is detected and for flowing a current along a second path when the prescribed speed is not detected; and
   a headlight relay, connected to the speed relay, for flowing a current from a current source to a headlight when the speed relay flows the current along the first path.

3. The control circuit according to claim 2 further comprising:
   a first electric indicator; and
   a function relay connected to the electric indicator, to the speed relay, and to the brake switch, for flowing a current along a third path to the first electric indicator when the brake switch detects the first prescribed hydraulic pressure and the speed relay flows the current along the second path.

4. The control circuit according to claim 3 wherein the brake control device includes a valve having an open position for allowing flow of hydraulic fluid therethrough and a closed position for inhibiting flow of hydraulic fluid therethrough, and the control circuit further comprises a function solenoid connected to the valve and to the function relay for receiving the current flowing along the third path and for closing the valve and maintaining hydraulic pressure in the oil path in response thereto.

5. The control circuit according to claim 4 further comprising:
   a second electric indicator;
   a pressure switch, connected to the oil path, for detecting a second prescribed hydraulic pressure in the oil path and for flowing a current from a current source to the second electric indicator in response thereto.

6. The control circuit according to claim 4 wherein the brake releasing means comprises:
   an accelerator switch cooperatively mounted with the accelerating means;
   a release solenoid connected to the valve for opening the valve and for releasing the oil pressure in the oil path when a current is supplied to the release solenoid; and
   a release relay, connected to the accelerator switch and to the release solenoid, for flowing a current to the release solenoid when the vehicle is accelerated.

7. The control circuit according to claim 3 further comprising:
   a parking switch; and
   means, connected to the parking switch, to the pressure switch, and to the function relay, for inhibiting the function relay from flowing the current along the third path and for inhibiting the brake releasing means when the parking switch is turned on and the pressure switch detects the second prescribed hydraulic pressure.

* * * * *